INVENTOR
EDWARD A. HEINER
BY Thomas S. Ross
ATTORNEY

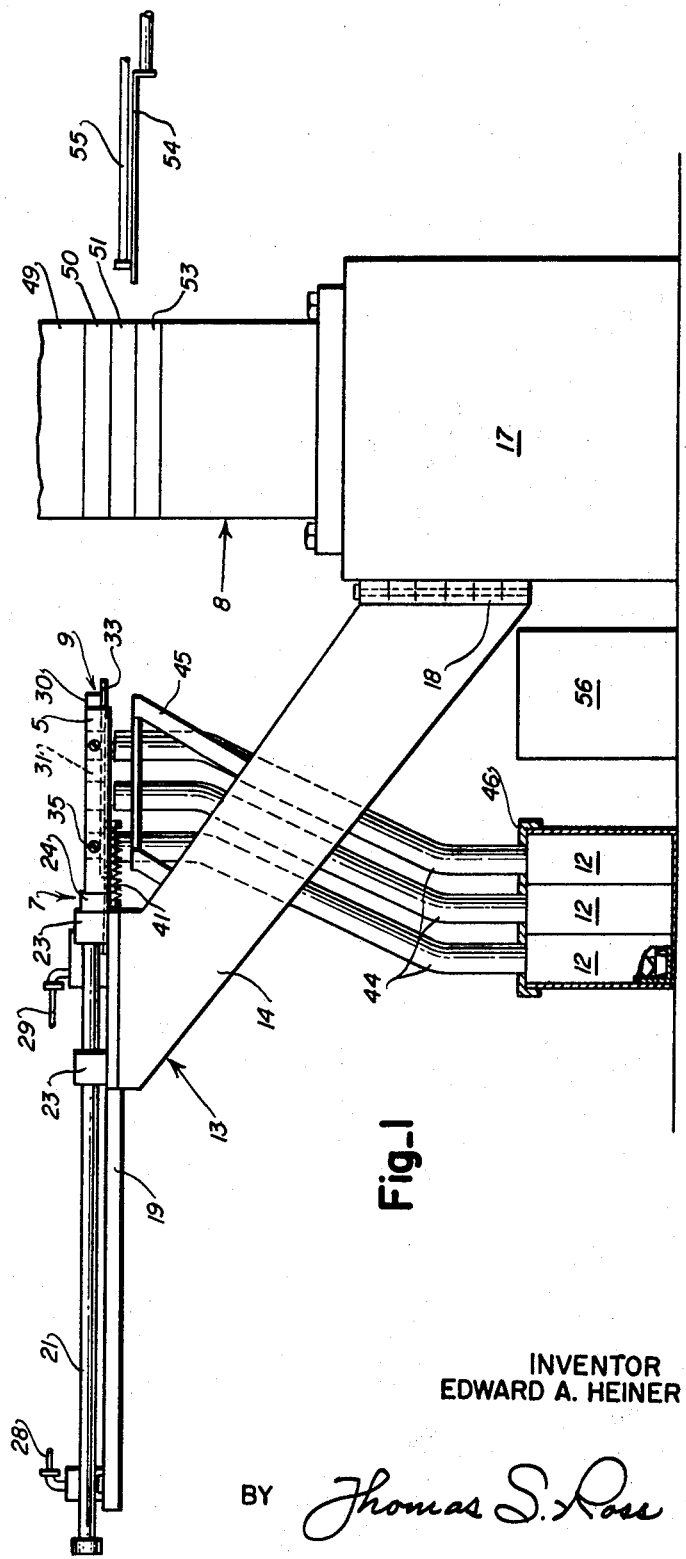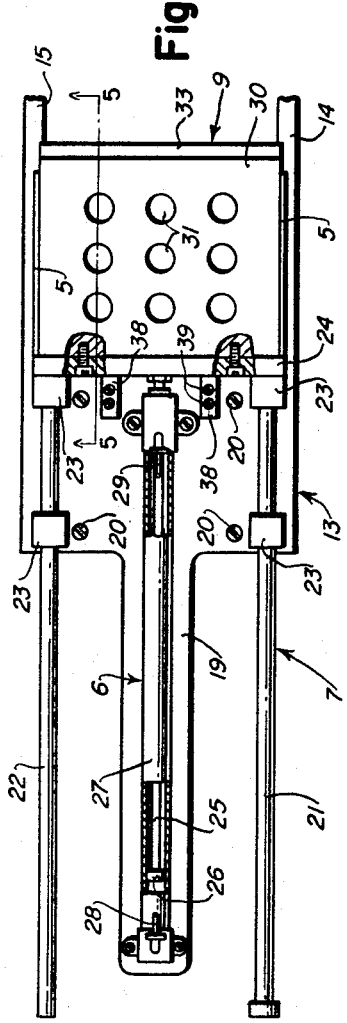

Nov. 5, 1968  E. A. HEINER  3,408,689
MULTI-RECEPTACLE CONVEYOR AND DISCHARGE APPARATUS
FOR DISSIMILAR MOLDED PARTS
Filed April 3, 1967  3 Sheets-Sheet 3

INVENTOR
EDWARD A. HEINER
BY *Thomas S. Ross*
ATTORNEY

United States Patent Office 3,408,689
Patented Nov. 5, 1968

3,408,689
MULTI-RECEPTACLE CONVEYOR AND DISCHARGE APPARATUS FOR DISSIMILAR MOLDED PARTS
Edward A. Heiner, Rocky Hill, Conn., assignor to Litton Business System, Inc., a corporation of New York
Filed Apr. 3, 1967, Ser. No. 628,037
7 Claims. (Cl. 18—2)

ABSTRACT OF THE DISCLOSURE

A multi-receptacle conveyor and discharge apparatus for carrying segregated dissimilar molded parts from a mold station to a discharge station characterized by an assembly of a plate having a plurality of openings and a relatively movable shutter underlying the plate and movable relative thereto to block said openings when the plate is moved toward the mold station whereby segregated parts stripped from the mold are individually received in and held segregated in said blocked openings, and movable to allow said segregated parts to drop through said openings into separate part storage containers when said plate is moved to said discharge station.

---

This invention relates to conveyor and discharge apparatus for automatically receiving and holding segregated dissimilar molded parts as they are stripped from a mold and conveying said segregated parts to a discharge station; more particularly it relates to conveyor and discharge apparatus characterized by an assembly having relatively movable parts operable in one position to form receptacles for receiving and supporting individual molded parts as they are stripped from a mold and in another position to release said segregated molded parts to individual storage containers; more specifically it relates to conveyor and discharge apparatus wherein said relatively movable parts comprise juxtaposed plates having openings corresponding to each of the molded parts which are misaligned when the assembly is moved toward said mold station whereby parts stripped from said mold are supported for conveyance to said discharge station and are aligned when said assembly moves to said discharge station whereby said segregated molded parts drop into separate storage containers.

According to the present invention the automatic multi-receptacle conveyor and discharge apparatus for dissimilar molded parts may be used with a mold structure and molding machine such as disclosed in the copending application Ser. No. 611,135, filed Jan. 23, 1967, or with any one of the numerous molding machines or presses now in daily use for the production of molded articles such as business machine keytops having different indicia on each keytop.

The multi-receptacle conveyor and discharge mechanism includes a conveyor assembly supported by a frame for reciprocal movement between an extended part receiving station and a retracted part discharge station, whereby openings in said conveyor assembly are closed to receive and hold segregated molded parts stripped from a mold when the assembly is moved to said part receiving station and opened to discharge the segregated molded parts into individual storage receptacles when the assembly is moved to the retracted part discharge station.

One object of the present invention is to provide a very reliable, low cost and efficient conveyor and discharge apparatus for dissimilar molded articles, such as business machine keytops, each of which have different indicia thereon, as they are stripped from the mold of a molding machine.

Another object of the invention is to provide conveyor and discharge apparatus for dissimilar molded parts which will automatically discharge and direct or channel the segregated molded parts into individual receptacles or containers.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a side elevational view of automatic conveyor and discharge apparatus according to the present invention illustrated in association with portions of a conventional double injection molding machine and positioned at its discharge station;

FIGURE 2 is a top plan view of the automatic conveyor and discharge apparatus in FIGURE 1;

Figure 3:
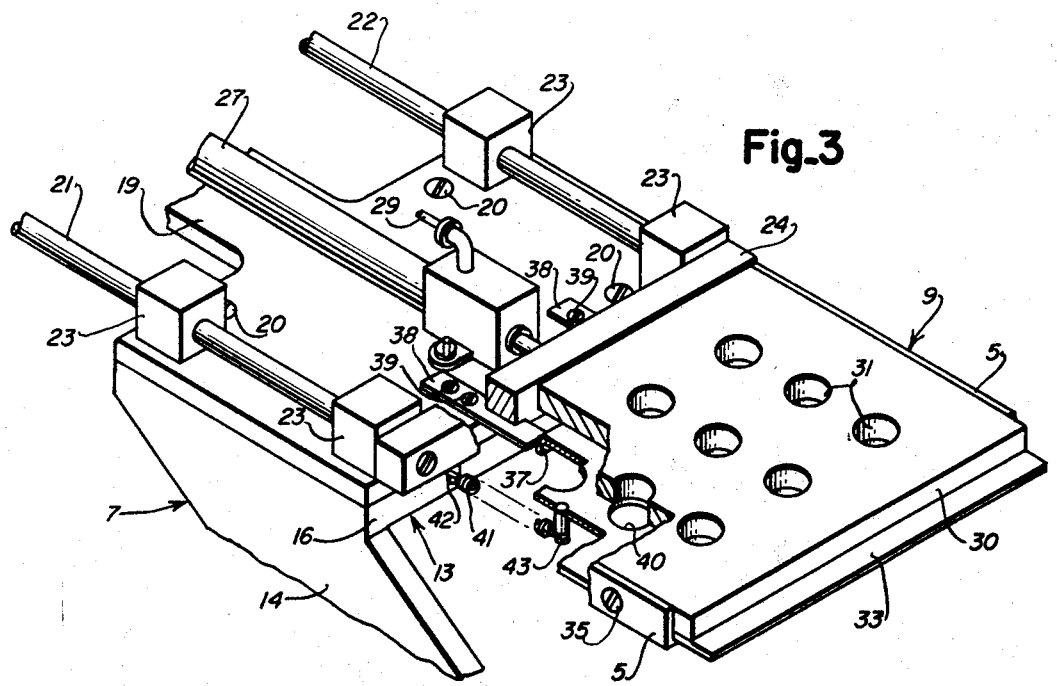
FIGURE 3 is an isometric view partly in section illustrating portions of the automatic conveyor and discharge apparatus located in its normal retracted position at a discharge station.

Referring now to the drawings in detail, and particularly to FIGURES 1 and 2, the automatic conveyor and discharge apparatus for dissimilar molded articles is designated generally by reference character 7 and illustrated in association with portions of a conventional double injection molding machine indicated generally by reference character 8.

Figure 5:
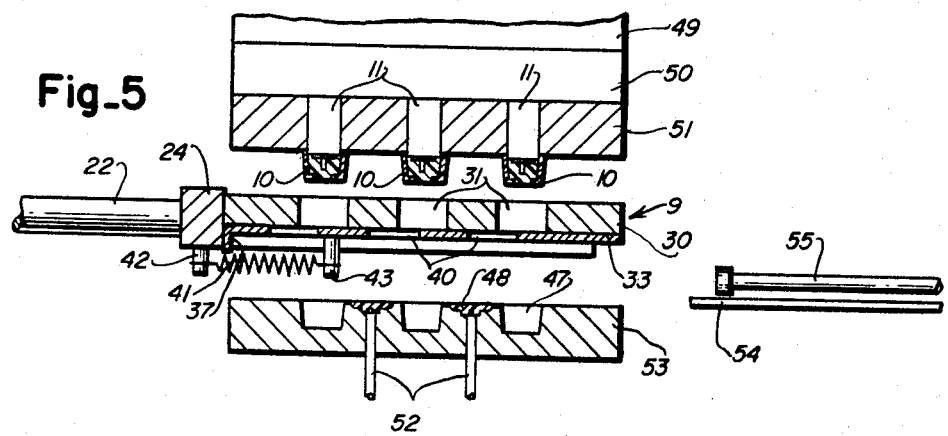
FIGURE 5 is a fragmentary sectional view of the apparatus along the line 5—5 of FIGURE 2 in fully extended position at the mold station positioned to receive and hold segregated individual dissimilar molded parts as they are stripped from the mold structure.

The conveyor apparatus 7 comprises an assembly 9 adapted to be moved from a discharge station or retracted position shown in FIGURE 1 to a mold station or extended position shown in FIGURE 5 to receive and hold segregated, in individual receptacles as will hereinafter appear, the molded parts 10 (FIGURE 5) as they are stripped and drop from the usual core pins 11 of the mold. The segregated molded parts 10 are then automatically carried from the FIGURE 5 position to the FIGURE 1 position by the conveyor assembly 9 whereat the individual receptacles are gated and the molded parts 10 are released and discharged into individual or separate storage containers 12 (FIGURE 1) in a manner presently described.

As best shown in FIGURES 1 and 2 the automatic sorting apparatus includes a substantially U-shaped frame 13 which comprises a pair of spaced parallel arms 14 and 15 inclined upwardly and outwardly from base 17 of the molding machine 8 and interconnected at their upper ends by a horizontally disposed cross plate or platform 16 preferably integrally formed with the upper ends of said arms 14–15. The lower end of frame 13 is connected to and supported by said base 17 of molding machine 8, preferably by a hinge 18, to permit the frame to swing in a horizontal path relative to said base for a purpose later explained. A substantially T-shaped plate 19 has its enlarged end (FIGURES 1 and 2) mounted upon and secured to the frame platform 16 by bolts 20 (FIGURE 3) and its reduced end projects leftward from platform 16 as clearly shown in FIGURES 1 and 2. A pair of horizontally disposed rods 21 and 22 are reciprocally supported by four spaced bearing blocks 23, the blocks being mounted upon, and suitably secured to, the enlarged end of plate 19. The right hand ends of rods 21–22 (FIGURE 2) are rigidly connected to a cross bar 24 which is connected to as will hereinafter appear and comprising part of the tray assembly 9. Also mounted upon the top surface of plate 19 (FIGURE 2) is an actuator for the cross bar 24 indicated generally at 6. The actuator 6 includes a piston rod 25, the right hand end of which is connected to said cross bar 24 and the left hand end connected to a piston 26 disposed within a cylinder 27.

The construction of the actuator 6, for cross bar 24, is such that when a motive fluid is introduced into cylinder 27, on opposite sides of piston 26 by way of conduits 28 and 29, the cross bar 24 and tray assembly 9 will be reciprocated toward and from the molding machine 8.

In accordance with the invention there is provided as shown in FIGURE 3 a plate-like shutter 33 supported for horizontal sliding movement directly beneath plate member 30 by a pair of L-shaped brackets or runners 5, the vertical walls of which are fastened to the sides of plate member 30 by bolts 35 and the horizontal walls, which form the runners 5, are spaced from the lower surface of plate member 30 a distance slightly greater than the thickness of the shutter plate 33. As will be hereinafter evident the shutter 33 acts to automatically cover the lower open ends of openings 31 thereby forming receptacles when the tray assembly 9 is in the fully extended position of FIGURE 5, and to uncover said lower ends of the openings (FIGURES 1 and 2) when the tray assembly 9 is in its fully retracted position.

More particularly the leftward end of shutter 33 is bent downwardly to form a lip 37 which cooperates with a pair of abutments or stop bars 38 fastened to the top surface of plate 19 by screws 39. The abutments act to force the shutter to move horizontally to the right beneath plate member 30 against the bias of springs 41 upon engagement of lip 37 with stops 38 when the assembly is retracted to the discharge station for a reason presently made clear. Plate 33 is further provided with a plurality of holes 40 which are spaced to correspond to the spacing of the openings 31 in plate member 30. Thus, when the tray assembly 9 is in the fully retracted position of FIGURE 3, holes 40 and openings 31 are in vertical registration. The shutter plate 33 is normally urged toward cross bar 24 by a pair of springs 41 one of which is clearly shown in FIGURE 3. One end of each spring 41 is anchored to a corresponding pin 42 projecting downwardly from cross bar 24 and the other end of each spring is anchored to a corresponding pin 43 which projects downwardly from plate 33, thereby biasing shutter 33 to the left when the plate 30 is moved to the right or to the mold station.

From the description thus far it will be apparent that plate member 30 and shutter plate 33 form receptacles to receive and hold the molded keytops or similar molded parts 10 segregated when tray assembly 9 is in the fully extended position (FIGURE 5) beneath the core pins 11 when the mold is open, and to release and discharge said molded parts 10 from said receptacles when the tray assembly 9 is returned to its fully retracted position as shown in FIGURE 3 and in which position the openings 31 of plate member 30 are in vertical alignment with the holes 40 of the shutter plate 33.

Means are provided for directing the segregated dissimilar molded parts 10 to individual containers 12 as they are released from the receptacles by movement of the shutter plate 33. This means preferably comprises a plurality of tubes 44, the upper open ends of which are held in vertical alignment with the receptacles of tray assembly 9 by a bracket element 45 which is suitably connected to and supported by the arms 14 and 15 of the U-shaped frame 13. The lower open ends of said tubes 44 are mounted within suitable openings formed in a cover 46 for the individual containers 12 as shown in FIGURE 1.

*Operation*

Figure 4:
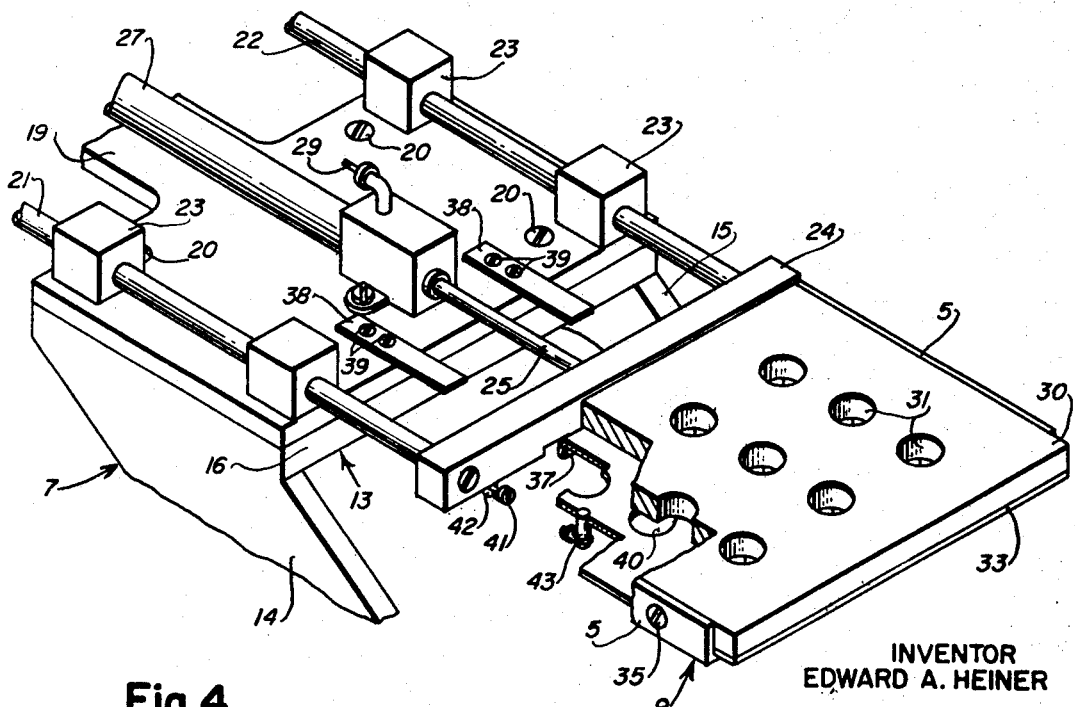
FIGURE 4 is a view similar to FIGURE 3 but illustrating the automatic conveyor and discharge apparatus in partially extended position toward a mold station.

Operation of the automatic conveyor and discharge apparatus for the dissimilar molded parts 10 is as follows:

When the tray assembly 9 is fully retracted, and the mold of the molding machine 8 is in the closed position, as shown in FIGURE 1, a molding cycle for the molding machine is started by injecting molding material into the molding cavities 47 of the mold to form the dissimilar molded parts 10 and their runner 48. Near the end of the molding cycle, the movable platen 49 will be operated to lift the core pin plate 50 and transfer plate 51 upwardly to the first position (FIGURE 5) in the conventional and well known manner and when in this position the molded parts 10 will have been stripped from their runner 48 and are held by the core pins 11. Tray assembly 9 is then moved to its extended position within the open mold by introducing a motive fluid into cylinder 27 through conduit 28. The movement of the tray assembly 9 to fully extended position moves lip 37 of shutter 33 from stops 38 whereby the springs 41 pull the shutter to the left, misaligned holes 31 and 40 forming receptacles in vertical alignment with the core pins 11 to receive the dissimilar molded parts 10 (FIGURE 5). The leftward movement of the shutter by springs 41 is limited by engagement of the lip 37 of plate 33 against cross bar 24. Thus the portions of plate 33 between the holes 40 substantially cover or gate the lower open ends of the holes 31 forming receptacles to hold and maintain segregated the molded parts. Movable platen 49 is again moved upwardly to the second position of FIGURE 6 and in so moving the transfer plate 51 is moved downwardly from core pin plate 50 in the conventional manner to strip the dissimlar molded parts 10 from the core pins 11 allowing said molded parts to drop into their respective receptacles and be held within said receptacles by the shutter plate 33 as clearly shown in FIGURE 6. The tray assembly 9 is now moved to the retracted position of FIGURE 3 by introducing a motive fluid into cylinder 27 through conduit 29 of actuator 6. As cross bar 24 and tray assembly 9 approach the forward or right hand bearing blocks 23—23 (FIGURE 4) lip 37 of plate 33 is brought into engagement with the stops 38—38 thereby arresting any further leftward movement of said plate, and as the cross bar 24 and body member 30 continue to move leftwardly until cross bar 24 comes into contact with said bearing blocks 23—23 (FIGURE 3), shutter 33 is forced to the right thereby aligning holes 31 and 40 whereby the molded parts may drop into the upper open ends of their respective tubes 44 and fall downwardly therethrough into their respective containers 12.

Figure 6:
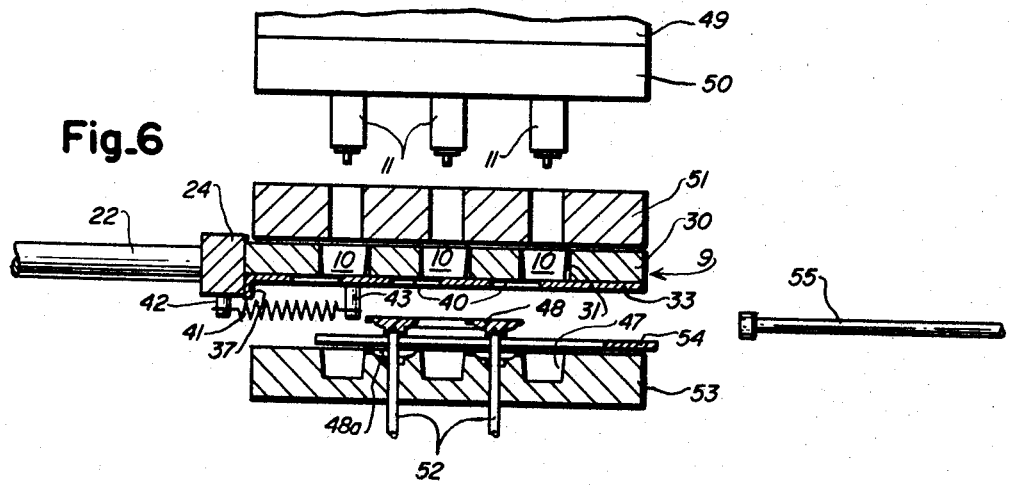
FIGURE 6 is a sectional view similar to FIGURE 5 but showing the dissimilar molded keytops or like parts stripped from the mold structure and received and supported in associated receptacles of the conveyor assembly.
Figure 7:
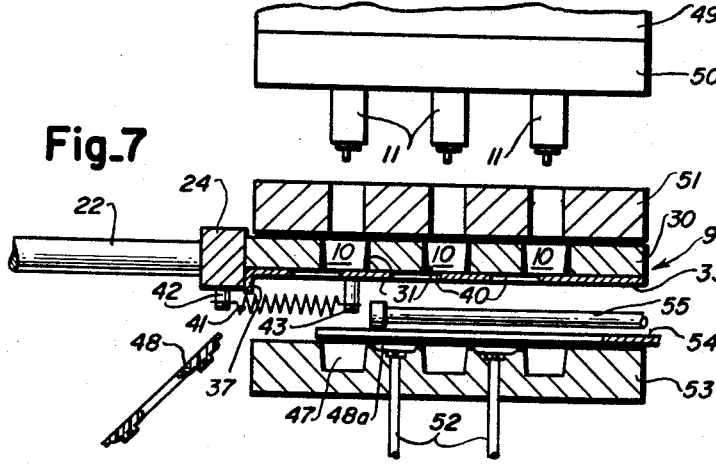
FIGURE 7 is a view similar to FIGURE 6 but showing the runner for the dissimilar molded parts being discharged from the conventional comb plate.

As the dissimilar molded parts 10 are being stripped from their associated core pins 11 and dropped into their respective receptacles of the tray assembly 9 as above explained, the conventional eject pins 52 for the runner 48 are elevated to lift said runner from its channel 48a, in cavity plate 53, as shown in FIGURE 6. The conventional stripper comb 54 is then moved into position beneath said runner by conventional means (not shown) and the eject pins are lowered to strip the runner from the pins thus leaving the runner 48 supported by said comb. Runner 48 is subsequently pushed from the comb 54 by a reciprocating scraper 55 in the usual and well known manner and falls by gravity into a bin or receptacle 56 adjacent the part containers 12 (FIGURE 1).

As above mentioned the lower end of frame 13 is preferably hingedly connected to base 17 of molding machine 8. This permits the frame to be swung to one side to facilitate removal and replacement of the mold structure or parts thereof and to remove the individual containers 12 when they become filled with the dissimilar molded parts such as the business machine keytops 10.

The invention claimed is:

1. In combination with a molding machine of the type having a mold adapted to simultaneously produce a plurality of dissimilar molded parts such as keytops for business machines and the like, the improvement in associated therewith, of means to receive individual ones of said dissimilar molded parts as they are stripped from said mold and then convey said separated molded parts to a discharge station whereat said parts are released and directed to corresponding individual storage containers, said means comprising:
   (a) a frame;
   (b) a conveyor assembly supported by said frame for horizontal reciprocating movement between an extended position and a retracted position relative to said frame;
   (c) actuator means for alternately moving said conveyor assembly between said extended and retracted position;
   (d) said conveyor assembly comprising a first plate having a plurality of spaced apart openings adapted to receive individual ones of said dissimilar molded parts as they are stripped from said mold;
   (e) a second plate movable relative to said first plate operable to support said molded parts within said openings when said conveyor assembly is in said extended position and to release said molded parts from said openings when said conveyor assembly is in said retracted position;
   (f) a plurality of individual storage receptacles for said segregated molded parts; and,
   (g) means to direct said segregated dissimilar molded parts from said openings to said individual storage containers while said conveyor assembly is at rest at said retracted position.

2. Apparatus as defined by claim 1 wherein said conveyor assembly comprises:
   (a) a first plate having a plurality of spaced holes formed therein;
   (b) a second plate having a plurality of holes therein spaced to correspond to the spacing of the holes in said first plate;
   (c) means adapted to slidably support said second plate beneath said first plate; and,
   (d) yieldable means connecting said first and second plates adapted to move said plates relative to one another to misalign the holes in said plates when said plates are moved to said extending position; and
   (e) means acting on said second plate to effect alignment of said holes when said plates are moved to said retracted position whereby said segregated molded parts are alternately held by and released from said conveyor assembly.

3. Apparatus as defined in claim 1 wherein said actuator means comprises:
   (a) a cylinder supported by said frame;
   (b) a piston reciprocally mounted within said cylinder;
   (c) a piston rod having one end connected to said piston and the other end connected to said tray assembly;
   (d) a pair of conduits disposed at opposite ends of said cylinder; and
   (e) a motive fluid adapted to be alternately introduced into said cylinder through said conduits to opposite sides of said piston thereby moving said tray assembly between said extended and retracted positions.

4. Apparatus as defined in claim 1 wherein the means for conveying the segregated dissimilar molded parts from the receptacles of said conveyor assembly to said individual storage containers comprises:
   (a) a plurality of open-ended tubes; and,
   (b) a bracket mounted upon said frame adapted to support said tubes with their upper open ends spaced to conform to the spacing of said openings in said first plate and their lower open ends spaced to conform to the upper ends of said storage containers.

5. A multi-receptacle conveyor and discharge apparatus adapted to receive and support a plurality of segregated dissimilar molded parts at a part receiving station and subsequently discharge said segregated molded parts at a part discharge station into corresponding individual storage containers, said apparatus comprising:
   (a) a frame;
   (b) a conveyor assembly including first and second plate members reciprocally supported by said frame for horizontal movement between a part receiving station and a part discharge station, said plate members having corresponding cooperating spaced holes therein adapted to provide a plurality of receptacles within which said molded parts are received and held at said receiving station and from which they are discharged at said discharge station;
   (c) an actuator for alternately moving said conveyor assembly between said part receiving and discharge stations;
   (d) automatically operated yieldable means adapted to move said plate members relative to one another to misalign the holes in said first plate member with the holes in said second plate to form a plurality of individual part receiving and supporting receptacles and to align the holes in said second plate member with the holes in said first plate member to discharge said molded parts from said receptacles;
   (e) a plurality of individual storage receptacles for said segregated molded parts, and
   (f) a plurality of open ended conveyor tubes located adjacent said discharge station adapted to direct said segregated molded parts upon being released from said conveyor assembly to said individual storage receptacles upon alignment of said holes in said first and second plate members at said discharge station.

6. In combination with a molding machine of the type having a mold adapted to simultaneously produce a plurality of dissimilar molded parts, the improvement of an automatic multi-conveyor and discharge apparatus associated therewith to automatically receive, convey, and then discharge said dissimilar molded parts into separate containers, said automatic apparatus comprising:
   (a) a frame supported by the base of said molding machine;
   (b) a conveyor assembly including a pair of plate members mounted for reciprocal horizontal movement between a position to receive and hold said dissimilar molded parts, and a position at which said parts are released;
   (c) a plurality of corresponding spaced-apart holes in said plate members adapted to form individual receptacles which serve to alternately support and release said parts;
   (d) resilient means normally acting to urge said plates to a position where the holes in one plate are out of registry with the holes in the other plate;
   (e) a plurality of adjacent individual storage containers for said molded parts;
   (f) a plurality of part conveying tubes the upper open ends of which are positioned beneath said plates and spaced to correspond to the spacing of the holes in said plates, and the lower open ends of which tubes are positioned above said storage containers and spaced to correspond to the spacing of said containers; and,
   (g) means operable to move said plates between said part receiving position and said part releasing position whereby said segregated dissimilar molded parts after being stripped from said mold are automatically stored in their respective containers.

7. Automatic conveyor and discharge apparatus as defined in claim 6 wherein the lower end of said frame is hingedly connected to the base of said molding machine to permit said frame to swing outwardly in a horizontal plane relative to said molding machine thereby facilitating removal and replacement of said storage containers and ready access to the mold of said molding machine.

No references cited.

RICHARD E. AEGERTER, *Primary Examiner.*